(No Model.)
H. C. WIRT.
LAMP SOCKET.
No. 587,027. Patented July 27, 1897.
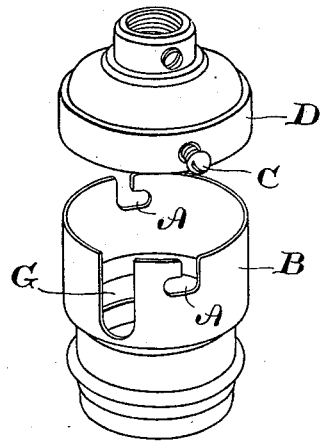
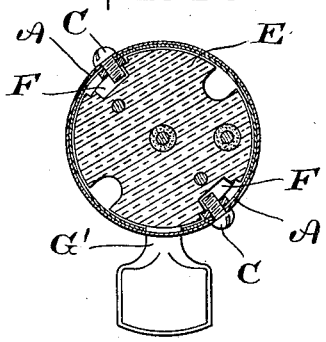
WITNESSES.
A. H. Abell.
A. F. Macdonald.
INVENTOR.
Herbert C. Wirt, by
Geo. R. Blodgett,
atty.
THE NORRIS PETERS CO., PHOTO-LITHO., WASHINGTON, D. C.

UNITED STATES PATENT OFFICE.

HERBERT C. WIRT, OF SCHENECTADY, NEW YORK, ASSIGNOR TO THE GENERAL ELECTRIC COMPANY, OF NEW YORK.

LAMP-SOCKET.

SPECIFICATION forming part of Letters Patent No. 587,027, dated July 27, 1897.

Application filed April 30, 1897. Serial No. 634,544. (No model.)

*To all whom it may concern:*

Be it known that I, HERBERT C. WIRT, a citizen of the United States, residing at Schenectady, in the county of Schenectady, State of New York, have invented certain new and useful Improvements in Lamp-Sockets, (Case No. 552,) of which the following is a specification.

This invention relates to incandescent-lamp sockets, and has for its object to avoid the usual enlarged opening in the shell for the passage of the shank of the key, and which will at the same time permit the two parts of the socket to be put together or taken apart without laterally moving the shank of the key in the opening in the shell of the socket through which the shank passes.

The invention consists in an improved incandescent-lamp socket constructed and arranged as hereinafter set forth and claimed.

Referring to the accompanying drawings, Figure 1 is a perspective view of the shell of an incandescent-lamp socket constructed in accordance with my invention with the two parts of the shell detached. Fig. 2 is an end view in cross-section through one end of the shell, showing the construction of the molded base and the manner of attaching the shell to said base.

Referring to Fig. 1, the usual form of incandescent-lamp-socket shell is shown constructed with the alining L-shaped openings A in one end of one of the parts B of the shell, with which L-shaped openings A are engaged the screws C, projecting through the periphery of the other part D of the shell, said screws C forming, with the L-shaped openings A, "bayonet-joints," thus securing the two parts of the shell together.

In the old form of incandescent-lamp socket or the forms now in use the molded base E, located in the part B of the shell, is formed with recesses, into each of which projects the screw C to engage the shell with the molded base. In such constructions in order to secure the shell to the molded base it was necessary to move the molded base and the part B of the shell simultaneously in order to lock the bayonet-joints, and to permit of this movement the opening through which the shank of the key projects had to be wide enough to permit the shank of the key to have a movement with the base across said opening.

In the present invention the shell is formed with a narrow opening G, just wide enough to permit the passage of the shank G' of the key, and the molded base is formed with the slots or lengthwise recesses F, into which project the screws C. By means of this construction, when the socket is put together the part D of the shell is shoved down onto the part B, the screws C projecting through the periphery of the part D of the shell and through the L-shaped slots A and passing down into the bottom of the L-shaped slots and the shank G' of the key into the narrow opening G. The part D of the shell is then turned on the part B and the screws C are thereby brought to the inner or closed end of the L-shaped openings F, thereby locking the two parts of the socket together, the key and the molded base remaining stationary.

By means of this construction the opening about the shank of the key is a comparatively closed one and the two parts of the socket are firmly secured together.

What I claim is—

1. An incandescent-lamp socket, formed of a two-part shell, one part thereof being provided with L-shaped open slots, and the other with screws projecting through the said L-shaped slots; in combination with a molded base having enlarged recesses into which the ends of said screws project and have play to lock the parts together, as and for the purpose set forth.

2. An incandescent-lamp socket, formed of a two-part shell, one of said parts having alining L-shaped open slots and a narrow open slot for the key-shaft, and a molded base in said part of the shell having enlarged recesses; in combination with a second part of the shell having locking-screws projecting through its periphery and adapted to project into said enlarged recesses, said second part of the shell being adapted to be pushed down and partly rotated upon the first part of the shell to engage its locking-screws with the L-shaped open slots in the first part of the shell and lock the parts together.

3. In an incandescent-lamp socket, a two-part shell, one part having L-shaped open slots, and the other screws engaging said L-shaped slots and forming therewith bayonet-joints to lock the parts together, one part of the shell also having a comparatively narrow open slot for the key-shank, and a molded base having enlarged recesses into which project and have play therein the screws of the bayonet-joints, as and for the purpose set forth.

In witness whereof I have hereunto set my hand this 20th day of April, 1897.

HERBERT C. WIRT.

Witnesses:
E. W. CADY,
M. H. EMERSON.